(12) United States Patent
Liebherr (10) Patent No.: US 11,310,204 B2
(45) Date of Patent: Apr. 19, 2022

(54) CENTRALIZED ACCESS TO DATA REPOSITORY FROM A MULTI-CLOUD COMPUTING ENVIRONMENT

(71) Applicant: SAP SE, Walldorf (DE)

(72) Inventor: Wolf Liebherr, Bruchsal (DE)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 16/189,030

(22) Filed: Nov. 13, 2018

(65) Prior Publication Data

US 2020/0153798 A1  May 14, 2020

(51) Int. Cl.
*H04L 29/06* (2006.01)
*H04L 9/32* (2006.01)
*G06F 21/62* (2013.01)
*H04L 67/1097* (2022.01)
*H04L 67/5683* (2022.01)
*H04L 67/02* (2022.01)
*G06F 21/60* (2013.01)

(52) U.S. Cl.
CPC ........ *H04L 63/0281* (2013.01); *G06F 21/602* (2013.01); *G06F 21/6218* (2013.01); *H04L 9/3242* (2013.01); *H04L 67/02* (2013.01); *H04L 67/1097* (2013.01); *H04L 67/2857* (2013.01)

(58) Field of Classification Search
CPC ............... H04L 63/0281; H04L 9/3242; H04L 67/1097; H04L 67/2857; H04L 67/02; H04L 63/126; H04L 67/10; H04L 67/2842; H04L 69/08; H04L 67/2814; G06F 21/6218; G06F 21/602
See application file for complete search history.

(56) References Cited

U.S. PATENT DOCUMENTS

| | | | |
|---|---|---|---|
| 8,812,482 B1* | 8/2014 | Kapoor ................. | G06F 16/273 707/713 |
| 2012/0173870 A1* | 7/2012 | Reddy ................. | H04L 63/0428 713/153 |
| 2012/0278872 A1* | 11/2012 | Woelfel .............. | H04L 63/0281 726/7 |
| 2014/0108486 A1* | 4/2014 | Borzycki ................ | H04L 67/10 709/201 |

(Continued)

*Primary Examiner* — Chau Le
*Assistant Examiner* — Andrew Suh
(74) *Attorney, Agent, or Firm* — Mintz Levin Cohn Ferris Glovsky and Popeo, P.C.

(57) ABSTRACT

A method for accessing a web-based repository service from a cloud platform is provided. The method may include receiving, at a gateway controller, a first request from an endpoint to access the web-based repository service. Upon successfully verifying the first request, a redirect request to a reverse proxy at the gateway controller may be returned to the endpoint. The redirect request may include a cryptographic signature and the first request. The reverse proxy may respond to the redirect request from the endpoint by accessing, on behalf of the endpoint, the web-based repository service to store and/or retrieve data. The web-based repository service may be accessed by sending, to the web-based repository service, an encrypted second request corresponding to the first request. Related systems and articles of manufacture, including computer program products, are also provided.

16 Claims, 5 Drawing Sheets

(56) References Cited

U.S. PATENT DOCUMENTS

| | | | |
|---|---|---|---|
| 2015/0229638 A1* | 8/2015 | Loo | H04L 63/08 |
| | | | 726/9 |
| 2016/0088023 A1* | 3/2016 | Handa | H04L 67/2823 |
| | | | 726/1 |
| 2016/0261616 A1* | 9/2016 | Shulman | H04L 63/0272 |
| 2018/0160156 A1* | 6/2018 | Hannuksela | H04N 21/8456 |
| 2019/0103968 A1* | 4/2019 | Srinivasan | G06F 21/41 |
| 2019/0228144 A1* | 7/2019 | Kermes | H04L 63/083 |
| 2019/0238508 A1* | 8/2019 | Hira | H04L 41/0893 |

* cited by examiner

CENTRALIZED ACCESS TO DATA REPOSITORY FROM A MULTI-CLOUD COMPUTING ENVIRONMENT

FIELD

The present disclosure generally relates to cloud computing and, more specifically, to centralizing access to a data repository from a multi-cloud computing environment.

BACKGROUND

In a cloud computing environment, multiple tenants may be served by a shared pool of computing resources including, for example, computer networks, servers, storage, applications, services, and/or the like. The cloud computing environment may have a multi-cloud architecture in which the shared pool of computing resources is hosted by several cloud providers. Moreover, the cloud computing environment may be a hybrid cloud computing environment that includes a mix of private cloud providers and public cloud providers.

SUMMARY

Methods, systems, and articles of manufacture, including computer program products, are provided for centralized access to a data repository from a multi-cloud computing environment. In some implementations of the current subject matter, there is provided a system. The system can include at least one data processor. The system can further include at least one memory storing instructions that result in operations when executed by the at least one data processor. The operations can include: receiving, from an endpoint, a first request to access a web-based repository service, the request being received at a gateway controller, and the endpoint being associated with a first cloud platform; upon the gateway controller successfully verifying the first request, sending, by the gateway controller and to the endpoint, a redirect request to a reverse proxy at the gateway controller, the redirect request including the first request; and responding, by the reverse proxy at the gateway controller, to the redirect request from the endpoint by at least accessing, on behalf of the endpoint, the web-based repository service to store and/or retrieve data, the web-based repository service being accessed by at least sending, to the web-based repository service, an encrypted second request corresponding to the first request.

In some variations, one or more of the features disclosed herein including the following features can optionally be included in any feasible combination. The redirect request may further include a cryptographic signature that the gateway controller generates for the endpoint, in response to successfully verifying the Hypertext Transfer Protocol request from the endpoint. The cryptographic signature may be a hashed message authentication code.

In some variations, the first request may be a Hypertext Transfer Protocol (HTTP) request and the encrypted second request may be a Hypertext Transfer Protocol Secure (HTTPS) request. The reverse proxy may be configured to translate the Hypertext Transfer Protocol request into the Hypertext Transfer Protocol Secure request.

In some variations, the web-based repository service may provide object-based storage, block-based storage, and/or file-based storage.

In some variations, the gateway controller may further store, in a cache associated with the gateway controller, at least a portion of data retrieved from the web-based repository service. The gateway controller may respond to a third request from the endpoint to access the web-based repository service to retrieve data by at least accessing the cache prior to accessing the web-based repository service.

In some variations, the first cloud platform and a second cloud platform may form a multi-cloud computing environment. Another instance of the gateway controller may be deployed at the second cloud platform to enable another endpoint at the second cloud platform to access the web-based repository service. The multi-cloud computing environment may be a hybrid cloud computing environment in which the first cloud platform is a private cloud platform and the second cloud platform is a public cloud platform.

In some variations, the gateway controller may receive the first request by at least intercepting the first request prior to the first request exiting a private network associated with the first cloud platform and/or entering a public network.

In another aspect, there is provided a method for centralized access to a data repository from a multi-cloud computing environment. The method may include: receiving, from an endpoint, a first request to access a web-based repository service, the request being received at a gateway controller, and the endpoint being associated with a first cloud platform; upon the gateway controller successfully verifying the first request, sending, by the gateway controller and to the endpoint, a redirect request to a reverse proxy at the gateway controller, the redirect request including the first request; and responding, by the reverse proxy at the gateway controller, to the redirect request from the endpoint by at least accessing, on behalf of the endpoint, the web-based repository service to store and/or retrieve data, the web-based repository service being accessed by at least sending, to the web-based repository service, an encrypted second request corresponding to the first request.

In some variations, one or more of the features disclosed herein including the following features can optionally be included in any feasible combination. The redirect request may further include a cryptographic signature that the gateway controller generates for the endpoint, in response to successfully verifying the Hypertext Transfer Protocol request from the endpoint. The cryptographic signature may be a hashed message authentication code.

In some variations, the first request may be a Hypertext Transfer Protocol (HTTP) request and the encrypted second request may be a Hypertext Transfer Protocol Secure (HTTPS) request. The reverse proxy may be configured to translate the Hypertext Transfer Protocol request into the Hypertext Transfer Protocol Secure request.

In some variations, the web-based repository service may provide object-based storage, block-based storage, and/or file-based storage.

In some variations, the method may further include storing, in a cache associated with the gateway controller, at least a portion of data retrieved from the web-based repository service; and responding to a third request from the endpoint to access the web-based repository service to retrieve data by at least accessing the cache prior to accessing the web-based repository service.

In some variations, the first cloud platform and a second cloud platform may form a multi-cloud computing environment. Another instance of the gateway controller may be deployed at the second cloud platform to enable another endpoint at the second cloud platform to access the web-based repository service.

In some variations, the gateway controller may receive the first request by at least intercepting the first request prior to the first request exiting a private network associated with the first cloud platform and/or entering a public network.

In some variations, one or more of the features disclosed herein including the following features can optionally be included in any feasible combination.

In another aspect, there is provided a computer program product that includes a non-transitory computer readable medium. The non-transitory computer readable medium may store instructions that cause operations when executed by at least one data processor. The operations may include:

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to mapping Internet Protocol addresses in a multi-cloud computing environment, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

A hybrid multi-cloud computing environment may include a shared pool of computing resources hosted by multiple cloud providers including, for example, private cloud providers, public cloud providers, and/or the like. As such, the hybrid multi-cloud computing environment may include a multitude of individual cloud computing platforms including, for example, private cloud computing platforms deployed on on-premise cloud infrastructures as well as public cloud computing platforms deployed on third-party cloud infrastructures. Moreover, these private cloud computing platforms and public cloud computing platforms may rely on a shared web-based repository service for storing data.

An endpoint from a cloud computing platform may be required to access a web-based repository service for storing and/or retrieving data. For example, the endpoint may use Hypertext Transfer Protocol (HTTP) requests to exchange data with the web-based repository service. Hypertext Transfer Protocol requests may be used within a private network environment, for example, between two endpoints within the same cloud computing platform, without raising any security concerns. However, Hypertext Transfer Protocol requests are not sufficiently secure for exchanging data, particularly sensitive and/or confidential data, over a public network such as, for example, the Internet. Accordingly, in some example embodiments, the gateway controller may be configured to broker the exchange of data between the web-based repository service and endpoints within a cloud computing platform. The gateway controller may serve as a reverse proxy for access the web-based repository service on behalf of the endpoints within the cloud computing platform in order store and/or retrieve data.

Figure 1:
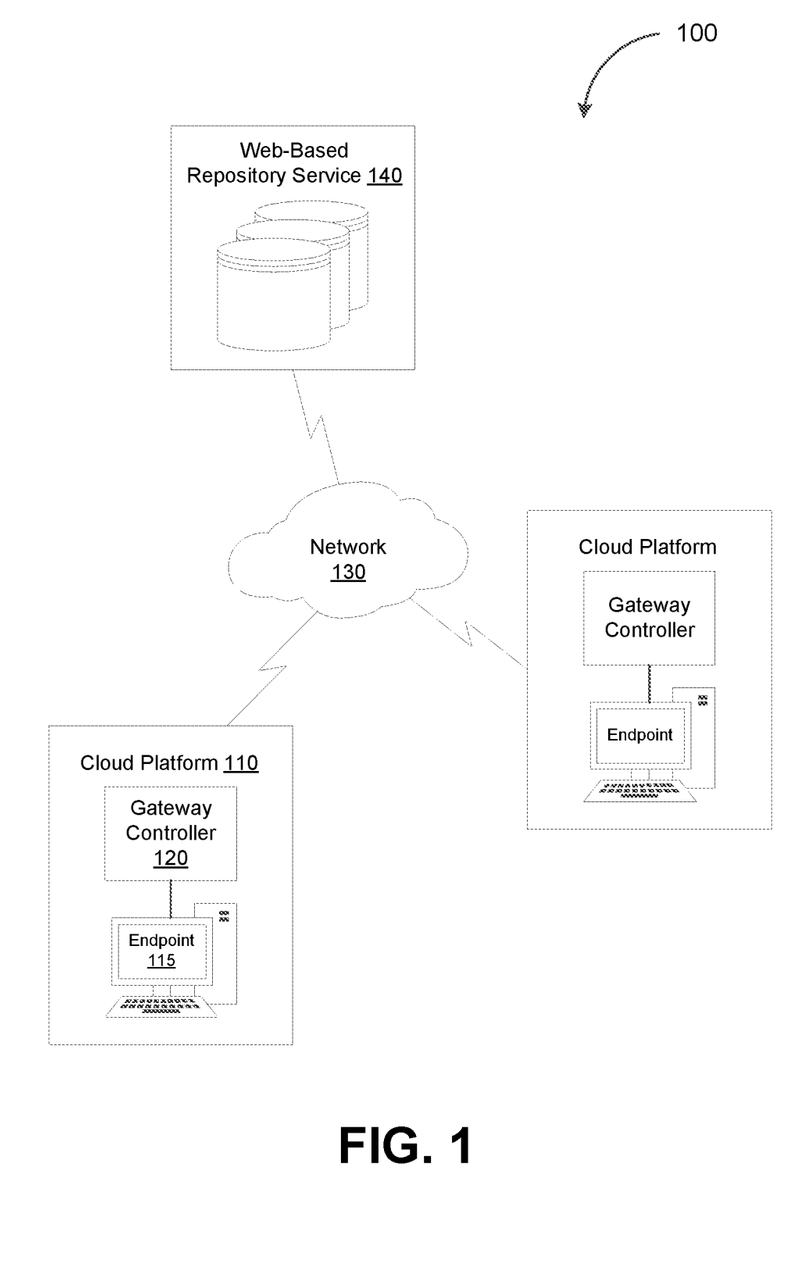
FIG. 1 depicts a system diagram illustrating a multi-cloud computing system, in accordance with some example embodiments.

FIG. 1 depicts a system diagram illustrating a multi-cloud computing system 100, in accordance with some example embodiments. Referring to FIG. 1, the multi-cloud computing system 100 may include a hybrid multi-cloud environment having multiple cloud-computing platforms hosted on private, on premise cloud infrastructures as well as public, third-party cloud infrastructures. For example, as shown in FIG. 1, the multi-cloud computing system 100 may include one or more cloud platforms including, for example, a cloud platform 110. The cloud platform 110 may be a public cloud platform deployed on public, third-party cloud infrastructure. Alternatively, the cloud platform 110 may be a private cloud platform deployed on private, on premise cloud infrastructure.

As shown in FIG. 1, the cloud platform 110 may be communicatively coupled, via a network 130, with a web-based repository service 140. The network 130 may be any wired and/or wireless network including, for example, a local area network (LAN), a wide area network (WAN), a public land mobile network (PLMN), the Internet, and/or the like. Meanwhile, the web-based repository service 140 may provide data storage services to one or more cloud platforms including, for example, the cloud platform 110. For example, the web-based repository service 140 may provide object-based storage in which data is stored as objects. However, it should be appreciated that the web-based repository service 140 may provide any type of storage services including, for example, block-based storage, file-based storage, and/or the like.

In some example embodiments, the cloud platform 110 may rely on the web-based repository service 140 for providing storage services including, for example, object-based storage, file-based storage, block-based storage, and/or the like. For instance, one or more endpoints within the cloud platform 110 including, for example, an endpoint 115, may access the web-based repository service 140 in order to store and/or retrieve data. However, the endpoints within the cloud platform 110 may be unable to access the web-based repository service 140 directly, for example, using Hypertext Transfer Protocol (HTTP) requests invoking a Hypertext Transfer Protocol method such as, for example, GET, POST, HEAD, and/or the like. As such, a gateway controller 120 may be configured to broker the exchange of data between the web-based repository service 140 and the endpoints within the cloud platform 110.

The endpoints within the cloud platform 110 may be unable to directly access the web-based repository service 140 for a number of reasons. For example, the Hypertext Transfer Protocol requests used to exchange data with the web-based repository service 140 may not be sufficiently secure for the exchange of data, particularly sensitive and/or confidential data, if the network 130 is a public network such as, for example, the Internet. Alternatively and/or additionally, the endpoints within the cloud platform 110 may be unable to directly access the web-based repository service 140 due to the endpoints not having access to a Hypertext Transfer Protocol proxy that would provide indirect access to the web-based repository service 140 over a public network such as, for example, the Internet. The endpoints within the cloud platform 110 may further be prevented from directly accessing the web-based repository service 140 due to performance and/or cost constraints. For example, downloading a large volume of data (e.g., application installation media stored as Binary Large Objects (BLOBs) and/or the like) directly from the web-based repository service 140 to the endpoint 115 (and/or a different endpoint) within the cloud platform 110 may give rise to a substantial quantity web traffic, thereby imposing significant cost and/or performance overhead.

In some example embodiments, the gateway controller 120 may be configured to broker the exchange of data between the web-based repository service 140 and the endpoints within the cloud platform 110 including, for example, the endpoint 115. For example, as shown in FIG. 1, the gateway controller 120 may be deployed at the cloud platform 110 to broker the exchange of data between the web-based repository service 140 and the endpoint 115 (and/or a different endpoint). By brokering the exchange of data between the web-based repository service 140 and the endpoint 115, the gateway controller 120 may obviate a direct exchange of data between the web-based repository service 140 and the endpoint 115, which may be conducted without adequate security using Hypertext Transfer Protocol (HTTP) requests over a public network (e.g., the Internet and/or the like).

Figure 2:
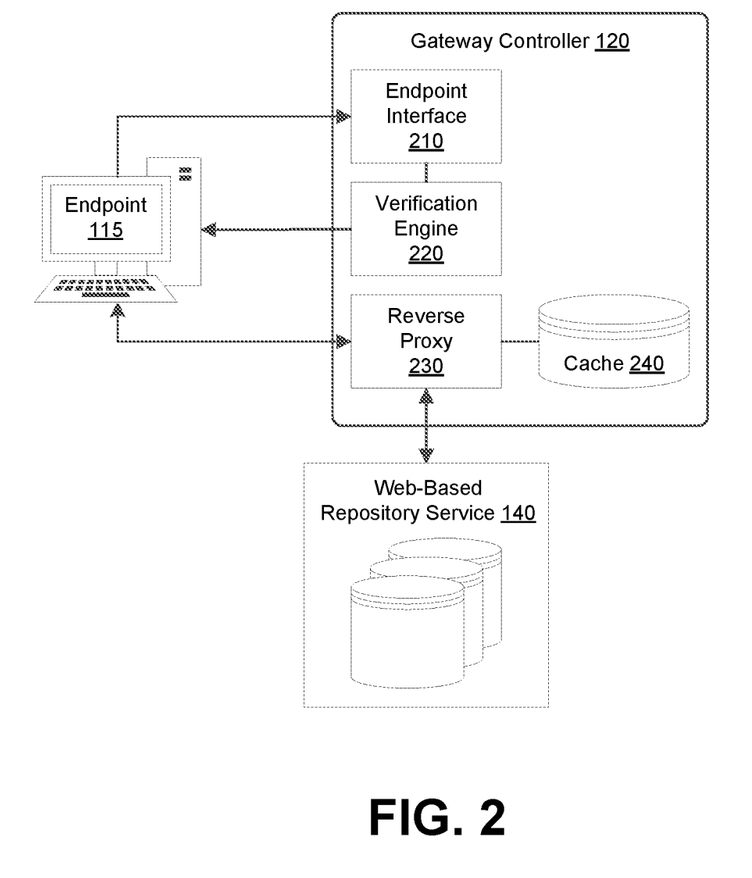
FIG. 2 depicts a block diagram illustrating a storage gateway controller, in accordance with some example embodiments.

FIG. 2 depicts a block diagram illustrating the gateway controller 120, in accordance with some example embodiments. Referring to FIGS. 1-2, the gateway controller 120 may include an endpoint interface 210, a verification engine 220, a reverse proxy 230, and a cache 240. However, it should be appreciated that the gateway controller 120 may include additional and/or different components then shown.

In some example embodiments, the endpoint 115 may send a request to access the web-based repository service 140, for example, to store and/or retrieve data. For example, the endpoint 115 may send a Hypertext Transfer Protocol (HTTP) request invoking a Hypertext Transfer Protocol method such as, for example, GET, POST, HEAD, and/or the like. The request to access the web-based repository service 140 may be sent to and/or intercepted by the endpoint interface 210 at the gateway controller 120 instead of being sent directly to the web-based repository service 140. Accordingly, the Hypertext Transfer Protocol request from the endpoint 115 may be confined within the trusted, internal network environment of the cloud platform 110 instead of being sent over a public network such as, for example, the Internet. This exchange of the Hypertext Transfer Protocol request between the endpoint 115 and the gateway controller 120 may not raise security concerns because the exchange transpires within the trusted, internal network environment of the cloud platform 110.

In some example embodiments, the endpoint interface 210 may forward, to the verification engine 220, the request from the endpoint 115. The verification engine 220 may be configured to implement access controls by at least verifying the request from the endpoint 115 to access the web-based repository service 140. For example, the endpoint 115 may request to access the web-based repository service 140 to store and/or retrieve a specific object, file and/or block from the web-based repository service 140. Accordingly, the verification engine 220 may determine whether the endpoint 115 is authorized to access the web-based repository service 140. Alternatively and/or additionally, the verification engine 220 may determine whether the endpoint 115 is authorized to store and/or retrieve that specific object, file, and/or block from the web-based repository service 140. These determinations may be made based on a header included in the Hypertext Transfer Protocol request from the endpoint 115, an Internet Protocol (IP) address of the endpoint 115, and/or the like.

Upon successfully verifying the request from the endpoint 115, the verification engine 220 may generate a cryptographic signature, for example, a hashed message authentication code (HMAC), for the endpoint 115. The verification engine 220 may subsequently return, to the endpoint 115, a redirect request that includes the cryptographic signature as well as the original Hypertext Transfer Protocol (HTTP) request to access the web-based repository service 140. It should be appreciated that the cryptographic signature (e.g., a hashed message authentication code (HMAC) and/or the like) may be required for the endpoint 115 to access the web-based repository service 140. For example, the endpoint 115 may be authenticated at the web-based repository service 140 based on the cryptographic signature.

The endpoint 115 may follow the redirect request and contact the reverse proxy 230 at the gateway controller 120. For example, the endpoint 115 may send, to the reverse proxy 230, the redirect request including the cryptographic signature (e.g., the hashed message authentication code (HMAC)) and the original Hypertext Transfer Protocol (HTTP) request to access the web-based repository service 140. In doing so, the endpoint 115 may establish a first communication session between the endpoint 115 and the reverse proxy 230 at the gateway controller 120.

In some example embodiments, the reverse proxy 230 may respond by at least accessing the web-based service 140 on behalf on the endpoint 115, for example, to store and/or retrieve data (e.g., one or more objects, blocks, files, and/or the like). For example, the reverse proxy 230 may establish a second communication session between the reverse proxy 230 and the web-based service 140. Moreover, the reverse proxy 230 may access the web-based service 140 in a secure manner, for instance, through an encrypted communication channel. For example, if the redirect request includes a Hypertext Transfer Protocol (HTTP) request instead of a Hypertext Transfer Protocol Secure (HTTPS) request, the reverse proxy 230 may be configured to translate the Hypertext Transfer Protocol request into a Hypertext Transfer Protocol Secure (HTTPS) request, thereby securitizing the request for communication over a public network (e.g., the Internet).

The Hypertext Transfer Protocol Secure request may be encrypted whereas the original Hypertext Transfer Protocol request remains unencrypted. Furthermore, the reverse proxy 230 may be configured to access the web-based repository service 140 by at least sending, to the web-based repository service 140, the Hypertext Transfer Protocol Secure (HTTPS) request. In doing so, the reverse proxy 230 may store and/or retrieve data from the web-based repository service 140 on behalf of the endpoint 115 while ensuring that the data is being exchanged in a secure manner using, for example, Hypertext Transfer Protocol Secure (HTTPS) instead of plain Hypertext Transfer Protocol (HTTP). The Hypertext Transfer Protocol Secure (HTTPS) request may be secure against interception by an unauthorized third party. Instead, the contents of the Hypertext Transfer Protocol Secure request may only be accessed by the endpoint 115, the reverse proxy 230 at the gateway controller 120, and the web-based repository 140. That is, it should be appreciated that the Hypertext Transfer Protocol (HTTP) request may be redirected to the reverse proxy 230 in order to preserve the privacy of the data being exchanged between the endpoint 115 and the web-based repository 140.

In some example embodiments, the reverse proxy 230 may implement server-side caching for data that is being exchanged between the endpoint 115 and the web-based repository service 140. For example, as shown in FIG. 2, the reverse proxy 230 may store, in the cache 240, at least a portion of the data that the endpoint 115 is storing to and/or retrieving from the web-based repository service 140. Exchanging large volumes of data (e.g., Binary Large Objects (BLOBs) and/or the like)) between the endpoint 115 and the web-based repository service 140 may engender a substantial quantity of web traffic that imposes significant cost and/or performance overhand. As such, caching at least a portion of the data exchanged between the endpoint 115 and the web-based repository service 140 may reduce cost and/or improve performance. For example, data being retrieved from the web-based repository 140 may already be present in the cache 240, thereby enabling the reverse proxy 230 to respond to the request from the endpoint 115 by retrieving data from the cache 240 instead of retrieving the same data again the web-based repository service 140.

Figure 3:
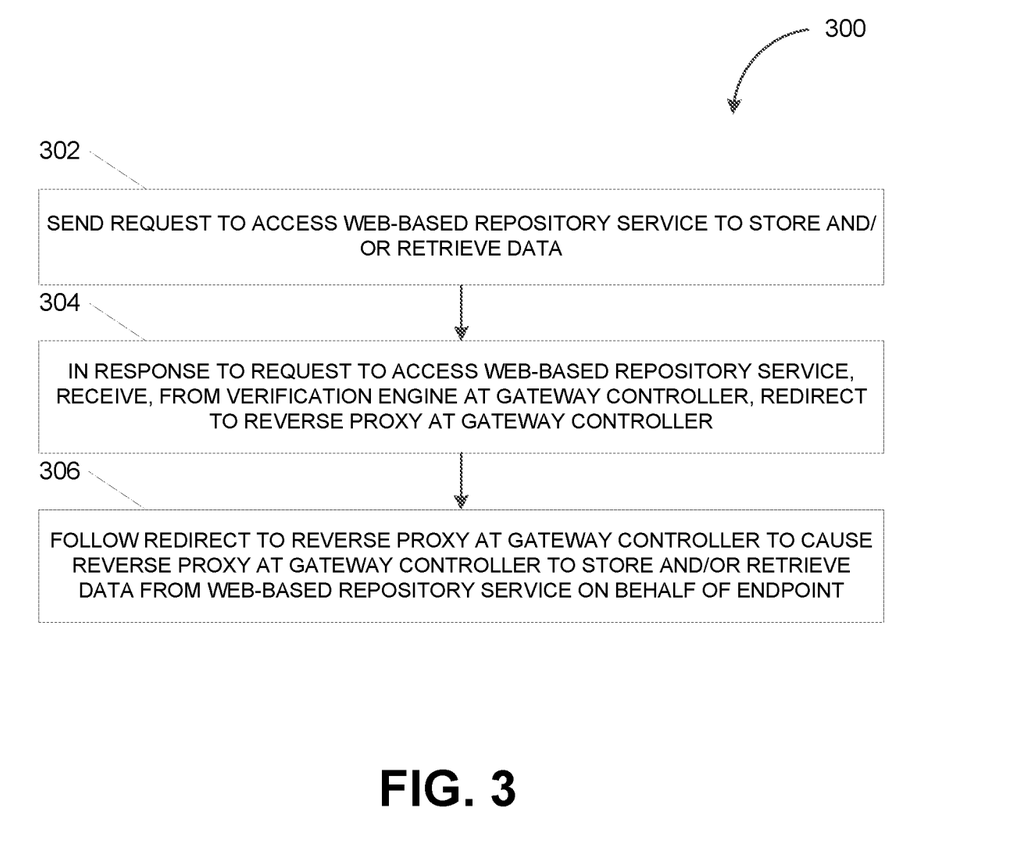
FIG. 3 depicts a flowchart illustrating a process for centralized access to a web-based repository service from a multi-cloud computing environment, in accordance with some example embodiments.

FIG. 3 depicts a flowchart illustrating a process 300 for centralized access to a web-based repository service from a multi-cloud computing environment, in accordance with some example embodiments. Referring to FIGS. 1-3, the process 300 may be performed by an endpoint within a cloud computing platform such as, for example, the endpoint 115 in the cloud platform 110.

At 302, the endpoint 115 may send a request to access the web-based repository service 140 to store and/or retrieve data. As noted, the web-based repository service 140 may provide data storage services including, for example, object-based storage, block-based storage, file-based storage, and/or the like. Accordingly, the endpoint 115 may send a Hypertext Transfer Protocol (HTTP) request to access the web-based repository service 140 in order to store and/or retrieve data.

At 304, in response to the request to access the web-based repository service 140, the endpoint 115 may receive, from the verification engine 220 at the gateway controller 120, a redirect request to the reverse proxy 230 at the gateway controller 120. In some example embodiments, the gateway controller 120 may be configured to broker the exchange of data between the endpoint 115 and the web-based repository service 140, thereby preventing a direct exchange of data between the endpoint 115 and the web-based repository service 140. As such, instead of being sent directly to the web-based repository service 140, the request from the endpoint 115 to access the web-based repository service 140 may be sent to and/or intercepted by the endpoint interface 210 at the gateway controller 120. Moreover, upon the request being successfully verified by the verification engine 220 at the gateway controller 120, the endpoint 115 may receive, from the verification engine 220, a redirect request that includes a cryptographic signature (e.g., a hashed message authentication code (HMAC)) for the endpoint 115 and the original request (e.g., the Hypertext Transfer Protocol request) to access the web-based repository service 140.

At 306, the endpoint 115 may follow the redirect request to the reverse proxy 230 at gateway controller 120 to cause the reverse proxy 230 at the gateway controller 120 to access the web-based repository service 140 to store and/or retrieve data on behalf of the endpoint 115. In some example embodiments, the reverse proxy 230 at the gateway controller 120 may be configured to access the web-based repository service 140 on behalf of the endpoint 115. For example, the endpoint 115 may follow the redirect request to the reverse proxy 230, which may respond to the redirect request by at least accessing, on behalf of the endpoint 115, the web-based repository service 140 to store and/or retrieve data. In order to access the web-based repository service 140 in a secure manner, the reverse proxy 230 may translate the Hypertext Transfer Protocol (HTTP) request from the endpoint 115 to a Hypertext Transfer Protocol Secure (HTTPS) request and send, to the web-based repository service 140, the Hypertext Transfer Protocol Secure request instead of the Hypertext Transfer Protocol request. Moreover, the reverse proxy 230 may reduce cost and/or improve performance by at least storing, in the cache 240, at least a portion of the data being stored to and/or retrieved from the web-based repository service. The caching of such data may prevent the same data from being retrieved repeatedly from the web-based repository service 140.

Figure 4:
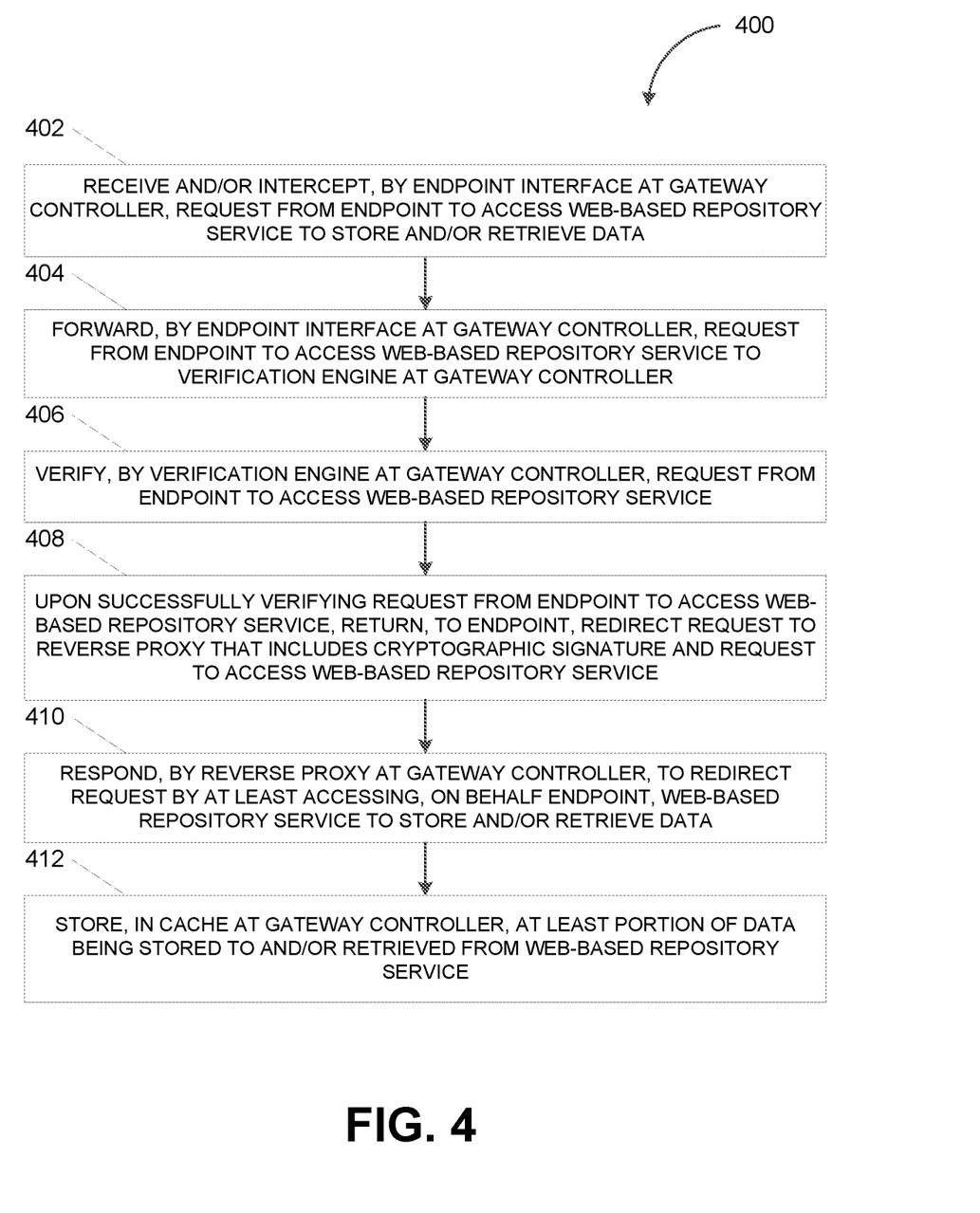
FIG. 4 depicts a flowchart illustrating a process for centralized access to a web-based repository service from a multi-cloud computing environment, in accordance with some example embodiments.

FIG. 4 depicts a flowchart illustrating a process 400 for centralized access to a web-based repository service from a multi-cloud computing environment, in accordance with some example embodiments. Referring to FIGS. 1-2 and 4, the process 400 may be performed by the gateway controller 120.

At 402, the endpoint interface 210 at the gateway controller 120 may receive and/or intercept, from the endpoint 115, a request to access the web-based repository service 140 to store and/or retrieve data. For example, the endpoint 115 may send a Hypertext Transfer Protocol (HTTP) request to access the web-based repository service 140 in order to store and/or retrieve data. The Hypertext Transfer Protocol request may invoke a Hypertext Transfer Protocol method such as, for example, GET, POST, HEAD, and/or the like. As noted, the web-based repository service 140 may provide data storage services including, for example, object-based storage, block-based storage, file-based storage, and/or the like. Meanwhile, the endpoint interface 210 at the gateway controller 120 may be configured to receive and/or intercept the request from the endpoint 115 to access the web-based repository service 140, thereby preventing a direct exchange of data between the endpoint 115 and the web-based repository service 140.

At 404, the endpoint interface 210 at the gateway controller 120 may forward, to the verification engine 220 at the gateway controller 120, the request from the endpoint 115 to access the web-based repository service 140. For instance, the endpoint interface 210 at the gateway controller 120 may forward, to the verification engine 220 at the gateway controller 120, the Hypertext Transfer Protocol (HTTP) request from the endpoint 115 to access the web-based repository service 140.

At 406, the verification engine 220 at the gateway controller 120 may verify the request from the endpoint 115 to access the web-based repository service 140. In some example embodiments, the verification engine 220 at the gateway controller 120 may be configured to implement access controls by at least verifying the request from the endpoint 115 to access the web-based repository service 140. The endpoint 115 may request to access the web-based repository service 140 in order to store and/or retrieve a specific object, file and/or block from the web-based repository service 140. Accordingly, the verification engine 220 at the gateway controller 120 may determine whether the endpoint 115 is authorized to access the web-based repository service 140. Alternatively and/or additionally, the verification engine 220 at the gateway controller 120 may determine whether the endpoint 115 is authorized to store and/or retrieve that specific object, file, and/or block from the web-based repository service 140. The verification engine 220 may make these determinations may be made based on a header included in the Hypertext Transfer Protocol request from the endpoint 115, an Internet Protocol (IP) address of the endpoint 115, and/or the like.

At 408, upon successfully verifying the request from the endpoint 115 to access the web-based repository service 140, the verification engine 220 at the gateway controller 120 may return, to the endpoint 115, a redirect request to the reverse proxy 230 that includes a cryptographic signature and the request to access the web-based repository service 140. In some example embodiments, in response to a successful verification of the request from the endpoint 115 to access the web-based repository service 140, the verification engine 220 at the gateway controller 120 may generate a cryptographic signature for the endpoint 115 such as, for example, a hashed message authentication code (HMAC) and/or the like. The verification engine 220 at the gateway controller 120 may further return, to the endpoint 115, a redirect request that includes the cryptographic signature and the original request to access the web-based repository service 140. As noted, the request from the endpoint 115 to access the web-based repository service 140 may be a Hypertext Transfer Protocol (HTTP) request that invokes a Hypertext Transfer Protocol method such as, for example, GET, POST, HEAD, and/or the like.

At 410, the reverse proxy 230 at the gateway controller 120 may respond to the redirect request from the endpoint 115 by at least accessing, on behalf of the endpoint 115, the web-based proxy service 140 to store and/or retrieve data. In some example embodiments, the endpoint 115 may follow the redirect request to the reverse proxy 230 at the gateway controller 120. Meanwhile, the reverse proxy 230 at the gateway controller 120 may respond to the redirect request by at least accessing the web-based repository service 140 on behalf of the endpoint 115. For example, the reverse proxy 230 at the gateway controller 230 may access the web-based repository service 140 in order to store and/or retrieve data on behalf of the endpoint 115.

According to some example embodiments, in order to access the web-based repository service 140 and store and/or retrieve data in a secure manner, the reverse proxy 230 at the gateway controller 120 may translate the Hypertext Transfer Protocol (HTTP) request from the endpoint 115 into a Hypertext Transfer Protocol Secure (HTTPS) request before sending, to the web-based repository service 140, the Hypertext Transfer Protocol Secure request instead of the Hypertext Transfer Protocol request. In doing so, the reverse proxy 230 at the gateway controller 120 may prevent data from being exchanged directly between the endpoint 115 and the web-based repository service 140 using an unsecured mechanism such as, for example, Hypertext Transfer Protocol requests.

At 412, the reverse proxy 230 at the gateway controller 120 may store, in the cache 240, at least a portion of the data being stored to and/or retrieved from the web-based proxy service 140. In some example embodiments, the reverse proxy 230 at the gateway controller 120 may implement server-side caching for the data exchanged between the endpoint 115 and the web-based repository service 140. For example, the reverse proxy 230 may store, in the cache 240, at least a portion of the data that the endpoint 115 is storing to and/or retrieving from the web-based repository service 140. Caching at least a portion of the data exchanged between the endpoint 115 and the web-based repository service 140 may reduce cost and/or improve performance, for example, by preventing the same data from being transferred repeatedly between the endpoint 115 and the web-based repository service 140. For instance, the reverse proxy 230 at the gateway controller 140 may be able to respond to the request from the endpoint 115 by retrieving data from the cache 240 instead the web-based repository service 140, if that data is already present in the cache 240.

Figure 5:
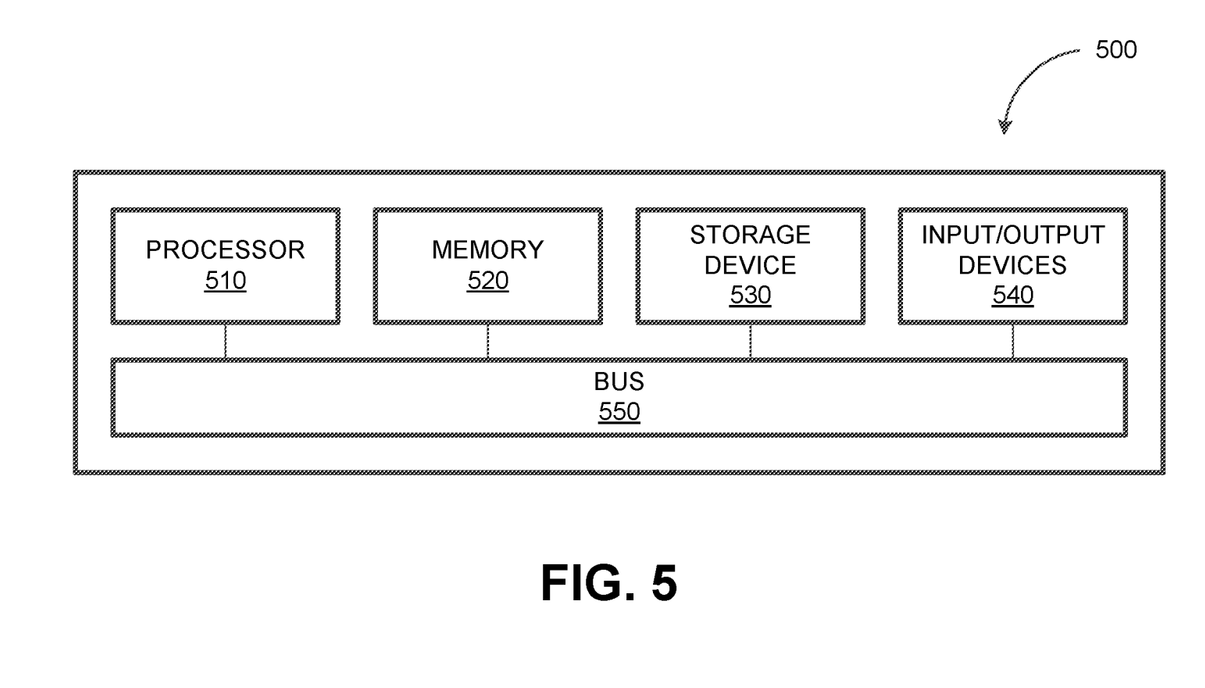
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1-5, the computing system 500 can be used to implement the gateway controller 120 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the gateway controller 120. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid state device, and/or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include users and servers. A user and server are generally remote from each other and typically interact through a communication network. The relationship of user and server arises by virtue of computer programs running on the respective computers and having a user-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A system, comprising:
   at least one data processor; and
   at least one memory storing instructions which, when executed by the at least one data processor, result in operations comprising:
   intercepting, at a gateway controller, a first request from an endpoint to access a web-based repository service accessible through a public network, the gateway controller and the endpoint being within a private network, the gateway controller configured to prevent unencrypted requests to access the web-based repository from exiting the private network and/or entering the public network by at least intercepting the unencrypted requests, and the endpoint being associated with a first cloud platform;

verifying, by the gateway controller, the first request to determine, based at least on an header of the first request and/or an Internet Protocol (IP) address of the endpoint, whether the endpoint is authorized to access the web-based repository service to store and/or retrieve a data associated with the first request;

upon the gateway controller successfully verifying the first request, sending, by the gateway controller and to the endpoint, a redirect request to a reverse proxy at the gateway controller, the redirect request including the first request, and the redirect request configured to be forwarded by the endpoint to the reverse proxy;

responding, by the reverse proxy at the gateway controller, to the redirect request from the endpoint by at least accessing, on behalf of the endpoint, the web-based repository service to store and/or retrieve the data associated with the first request, the web-based repository service being accessed by the reverse proxy translating the first request from an unencrypted request to an encrypted second request, and sending, to the web-based repository service via the public network, the encrypted second request corresponding to the first request;

storing, in a cache associated with the gateway controller, at least a portion of data retrieved from the web-based repository service; and intercepting, at the gateway controller, a third request from the endpoint to access the web-based repository service prior to the third request exiting the private network and/or entering the public network in order to confine the third request within the private network, the gateway controller responding to the third request by at least accessing the cache prior to accessing the web-based repository service, and the gateway controller using at least the portion of the data stored in the cache to respond to the third request.

2. The system of claim 1, wherein the redirect request further includes a cryptographic signature that the gateway controller generates for the endpoint, in response to successfully verifying the first request from the endpoint.

3. The system of claim 2, wherein the cryptographic signature comprises a hashed message authentication code.

4. The system of claim 1, wherein the first request comprises a Hypertext Transfer Protocol (HTTP) request, and wherein the encrypted second request comprises a Hypertext Transfer Protocol Secure (HTTPS) request.

5. The system of claim 4, wherein the reverse proxy is configured to translate the Hypertext Transfer Protocol request into the Hypertext Transfer Protocol Secure request.

6. The system of claim 1, wherein the web-based repository service provides object-based storage, block-based storage, and/or file-based storage.

7. The system of claim 1, wherein the first cloud platform and a second cloud platform form a multi-cloud computing environment, and wherein another instance of the gateway controller is deployed at the second cloud platform to enable another endpoint at the second cloud platform to access the web-based repository service.

8. The system of claim 7, wherein the multi-cloud computing environment comprises a hybrid cloud computing environment in which the first cloud platform comprises a private cloud platform and the second cloud platform comprises a public cloud platform.

9. A computer-implemented method, comprising:

intercepting, at a gateway controller, a first request from an endpoint to access a web-based repository service accessible through a public network, the gateway controller and the endpoint being within a private network, the gateway controller configured to prevent unencrypted requests to access the web-based repository from exiting the private network and/or entering the public network by at least intercepting the unencrypted requests, and the endpoint being associated with a first cloud platform;

verifying, by the gateway controller, the first request to determine, based at least on an header of the first request and/or an Internet Protocol (IP) address of the endpoint, whether the endpoint is authorized to access the web-based repository service to store and/or retrieve a data associated with the first request;

upon the gateway controller successfully verifying the first request, sending, by the gateway controller and to the endpoint, a redirect request to a reverse proxy at the gateway controller, the redirect request including the first request, and the redirect request configured to be forwarded by the endpoint to the reverse proxy;

responding, by the reverse proxy at the gateway controller, to the redirect request from the endpoint by at least accessing, on behalf of the endpoint, the web-based repository service to store and/or retrieve the data associated with the first request, the web-based repository service being accessed by the reverse proxy translating the first request from an unencrypted request to an encrypted second request, and sending, to the web-based repository service via the public network, the encrypted second request corresponding to the first request;

storing, in a cache associated with the gateway controller, at least a portion of data retrieved from the web-based repository service; and intercepting, at the gateway controller, a third request from the endpoint to access the web-based repository service prior to the third request exiting the private network and/or entering the public network in order to confine the third request within the private network, the gateway controller responding to the third request by at least accessing the cache prior to accessing the web-based repository service, and the gateway controller using at least the portion of the data stored in the cache to respond to the third request.

10. The method of claim 9, wherein the redirect request further includes a cryptographic signature that the gateway controller generates for the endpoint, in response to successfully verifying the first request from the endpoint.

11. The method of claim 10, wherein the cryptographic signature comprises a hashed message authentication code.

12. The method of claim 9, wherein the first request comprises a Hypertext Transfer Protocol (HTTP) request, and wherein the encrypted second request comprises a Hypertext Transfer Protocol Secure (HTTPS) request.

13. The method of claim 12, wherein the reverse proxy is configured to translate the Hypertext Transfer Protocol request into the Hypertext Transfer Protocol Secure request.

14. The method of claim 9, wherein the web-based repository service provides object-based storage, block-based storage, and/or file-based storage.

15. The method of claim 9, wherein the first cloud platform and a second cloud platform form a multi-cloud computing environment, and wherein another instance of the gateway controller is deployed at the second cloud platform to enable another endpoint at the second cloud platform to access the web-based repository service.

16. A non-transitory computer readable medium storing instructions, which when executed by at least one data processor, result in operations comprising:

- intercepting, at a gateway controller, a first request from an endpoint to access a web-based repository service accessible through a public network, the gateway controller and the endpoint being within a private network-, the gateway controller configured to prevent unencrypted requests to access the web-based repository from exiting the private network and/or entering enter the public network by at least intercepting the unencrypted requests, and the endpoint being associated with a first cloud platform;
- verifying, by the gateway controller, the first request to determine, based at least on an header of the first request and/or an Internet Protocol (IP) address of the endpoint, whether the endpoint is authorized to access the web-based repository service to store and/or retrieve a data associated with the first request;
- upon the gateway controller successfully verifying the first request, sending, by the gateway controller and to the endpoint, a redirect request to a reverse proxy at the gateway controller, the redirect request including the first request, and the redirect request configured to be forwarded by the endpoint to the reverse proxy;
- responding, by the reverse proxy at the gateway controller, to the redirect request from the endpoint by at least accessing, on behalf of the endpoint, the web-based repository service to store and/or retrieve the data associated with the first request, the web-based repository service being accessed by the reverse proxy translating the first request from an unencrypted request to an encrypted second request, and sending, to the web-based repository service via the public network, the encrypted second request corresponding to the first request;
- storing, in a cache associated with the gateway controller, at least a portion of data retrieved from the web-based repository service; and
- intercepting, at the gateway controller, a third request from the endpoint to access the web-based repository service prior to the third request exiting the private network and/or entering the public network in order to confine the third request within the private network, the gateway controller responding to the third request by at least accessing the cache prior to accessing the web-based repository service, and the gateway controller using at least the portion of the data stored in the cache to respond to the third request.

* * * * *